United States Patent

[11] 3,610,659

| [72] | Inventor | Donald R. Gerarde<br>86 Fairlane Drive, Wethersfield, Conn. 06109 |
|---|---|---|
| [21] | Appl. No. | 830,253 |
| [22] | Filed | June 4, 1969 |
| [45] | Patented | Oct. 5, 1971 |

[54] WHEEL FORK
4 Claims, 10 Drawing Figs.

[52] U.S. Cl. .................................................... 280/279,
301/125, 85/50 R
[51] Int. Cl. ...................................................... B62k 25/00
[50] Field of Search ............................................ 280/279,
11.23, 515; 301/125; 74/242.14; 287/100, 101;
85/50

[56] References Cited
UNITED STATES PATENTS

| 614,232 | 11/1898 | Norton | 301/125 |
| 625,199 | 5/1899 | Pihlfedt | 74/242.14 |
| 2,630,020 | 3/1953 | Juy | 74/242.14 |
| 3,507,516 | 4/1970 | Fritz | 280/279 |

FOREIGN PATENTS

| 25,776 | 1907 | Great Britain | 74/242.14 |
| 277,009 | 7/1914 | Germany | 280/11.23 |

*Primary Examiner*—Kenneth H. Betts
*Attorney*—Fishman and Van Kirk

ABSTRACT: A wheel fork is presented of the type wherein a wheel axle is mounted in a slot at the base of the fork. The slot is contoured so that it has sections of at least two different sizes, the smaller section serving as a path for inserting and removing the axle, and the larger section defining the mounting position for the axle. A bushing type retainer is used to lock the axle into the mounting position, or retention of the axle may be accomplished by cooperation between a contoured section on the axle and a shoulder between the larger and smaller sections of the slot.

PATENTED OCT 5 1971 3,610,659
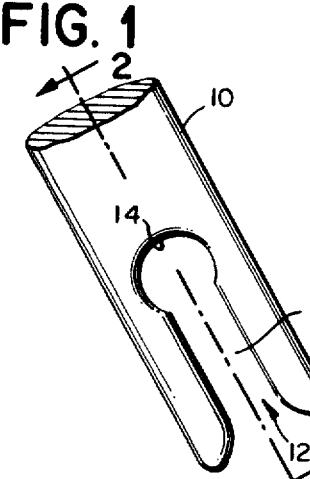
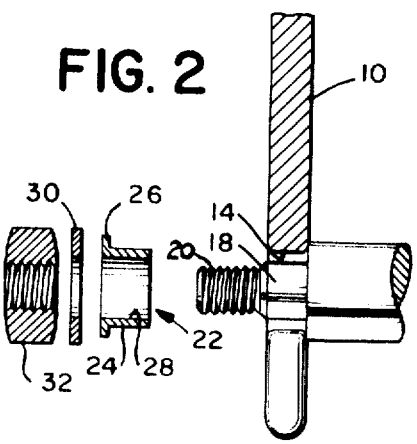
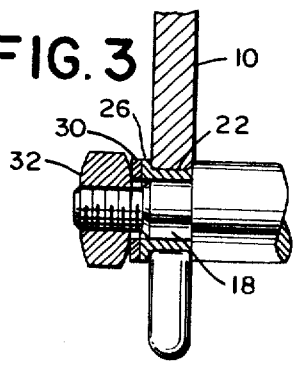
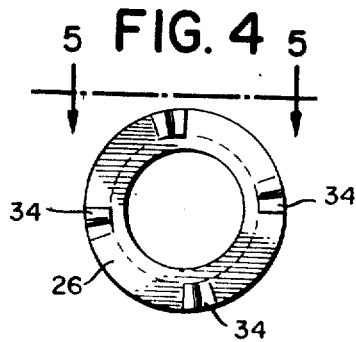
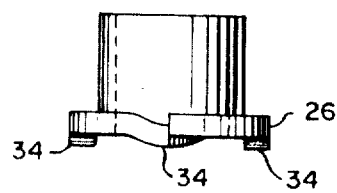
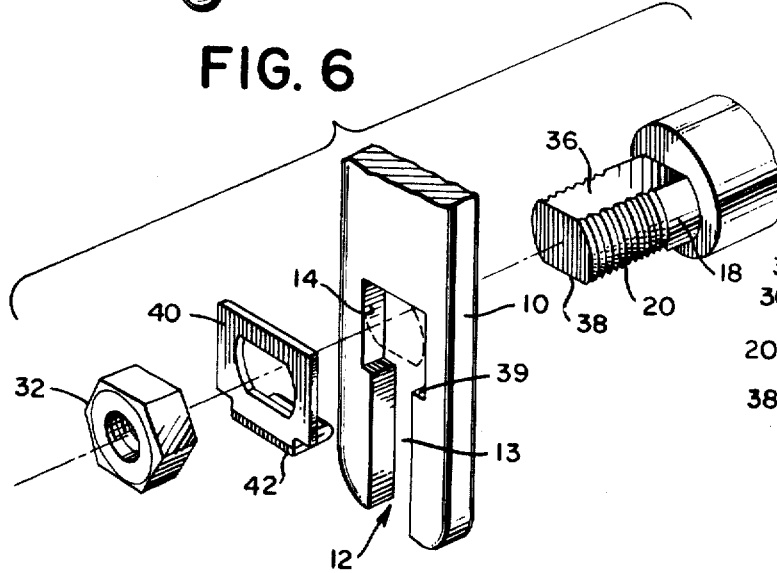
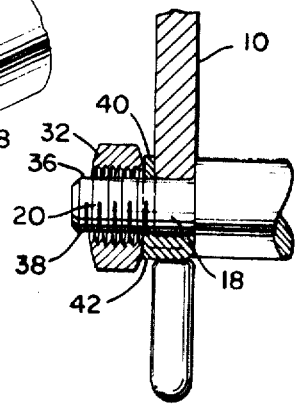
INVENTOR
DONALD R. GERARDE
BY
*FISHMAN & VAN KIRK*
ATTORNEYS

WHEEL FORK

BACKGROUND OF THE INVENTION

1. Field of the Invention

This invention relates to the field of wheel mountings. More particularly, this invention relates to the field of fork mountings for wheels, especially, but not limited to bicycle wheel mounts.

2. Background of the Invention

The present commonly used wheel-mounting structure for bicycles and many other vehicles involves a fork or other type of mounting plate having a slotted section which provides an opening at the bottom of the fork or plate. Except that it may have a rounded top, the slot is uniform in width along its length. The axle of the wheel to be mounted is located in the slot and is retained in place by typical retaining and locking elements such as nuts and washers. This prior art structure has an inherent deficiency in that the axle can easily escape from the fork or mounting plate in the event the retaining nuts and washers should become loosened. Thus, for example, in a bicycle, loosening of the retaining nuts and washers could easily result in disengagement of the axle and loss of the wheel while the bicycle is in motion, thereby resulting in serious injury to the rider. Such dangers are particularly acute with regard to the front wheel of bicycles, especially the presently popular "banana" bicycles with which it is popular to engage in "bucking" whereby the front wheel is lifted off the ground and then slammed back while the vehicle is in motion.

One known previous attempt in the art to eliminate this problem has involved a fork structure in which the open slot is replaced by a hole at midpoint of each element of the mounting fork. However, this approach requires a springing apart of the fork element each time it is desired to mount or remove a wheel, and thus substantial conveniences and advantages of the open slot arrangement are lost. Another known prior art attempt has involved the formation of a flanged outer portion on each element of the fork structure, but this approach involves substantial modification of the fork elements, requires a machining or other involved forming process and also presents the substantial likelihood of loss of the wheel in the event the locking nuts become loosened. An example of this type of arrangement may be seen in U.S. Pat. No. 1,010,381.

SUMMARY OF THE INVENTION

In the present invention, the prongs of a fork or other wheel support plate are formed having an open ended slot leading to a portion of the slot having an enlarged opening. The ends of the axle to be retained are positioned in the enlarged opening by being passed through the smaller section of open-ended slot, and a bushing is mounted on the axle. The bushing has an inner diameter sized to fit around the axle, and the bushing has an outer diameter which mates with the enlarged part of the slot and is wider than the width of the smaller section open-ended slot. Thus, the bushing prevents withdrawal of the axle through the open-ended slot. A retaining nut is threaded to the end of the axle to secure the bushing in place, and lock elements such as washers may be included. In another embodiment of the invention, the axle may have flat surfaces sized to allow passage of the axle through the open-ended slot when the axle is aligned with the flat surfaces parallel to the side of the slot. When positioned in the enlarged opening, the axle is rotated so that the flat surfaces are at an angle with respect to the open-ended slot, and the axle is then retained in the enlarged opening by a shoulder formed between the enlarged opening and the smaller part of open-ended slot. A bushing may also be included in this embodiment of the invention.

In all embodiments of the present invention the modified fork can be achieved through a die and without departing from the basic construction techniques now employed in the art.

Accordingly, one object of the present invention is to provide a novel and improved axle mounting and adjusting structure.

Another object of the present invention is to provide a novel and improved axle mounting and adjusting structure for wheel mounted axles.

Still another object of the present invention is to provide a novel and improved axle mounting and adjusting structure for bicycle wheels.

Still another object of the present invention is to provide a novel and improved fork structure for wheel mounting.

Still another object of the present invention is to provide a novel and improved fork element for wheel mountings wherein inadvertent disengagement of the axle from the fork is eliminated.

Other objects and advantages will be apparent from the following detailed description and drawings.

BRIEF DESCRIPTION OF THE DRAWINGS

In the drawings, wherein like elements are numbered alike in the several figures:

FIG. 1 is a side elevation view of the lower part of one prong of a bicycle fork incorporating the present invention.

FIGS. 1A, 1B, and 1C show alternative opening shapes for use in the fork of FIG. 1.

FIG. 2 is a front elevation view, taken along line 2—2 of FIG. 1, of one prong of a bicycle fork with axle structure added in accordance with the present invention, the parts being shown in exploded arrangement.

FIG. 3 is a view similar to FIG. 2 showing the parts in assembled relationship.

FIG. 4 is a front elevation view of a bushing for use in the present invention.

FIG. 5 is a view taken along line 5—5 of FIG. 4.

FIG. 6 is an exploded view of an alternative embodiment of the present invention.

FIG. 7 is an elevation of the embodiment of FIG. 6.

DESCRIPTION OF THE PREFERRED EMBODIMENTS

Although the present invention will be described in connection with a bicycle fork, it will be understood that the invention is not limited to such an embodiment, but rather the invention has general utility in any axle-retaining structure in which axles or wheels are retained in open-ended fork or plate structures, such as, for example, lawn mowers and snow blowers. Also, although the following description will be directed to a single prong of a fork structure, it will be understood that the prong and all of the retaining structure are duplicated on the other prong of the fork.

Referring now to FIG. 1, the lower end of a bicycle fork prong 10 has a slot 12. In the usual bicycle fork configuration the slot is of constant width for its full penetration along the length of the prong except that the closed end of the slot may be of semicircular shape or a radius of one-half the width of the slot. However, in the present invention the slot has an open ended section 13 and terminates in an enlarged closed end section 14 which is of arcuate shape and extends beyond the width of slot 12. As may be seen in FIG. 1, the narrower or smaller section 13 and enlarged portion 14 of slot 12 form what may be referred to as a keyhole configuration with at least part of the enlarged closed end 14 being wider than the width of section 13 of the slot. The shape of enlarged end 14 is not limited to the arcuate shape shown in FIG. 1. FIGS. 1A, 1B and 1C show possible alternative shapes for enlarged end 14, and thus it may be seen that enlarged end 14 could be rectangular (including square), or hexagonal, for example, and it also could have a repetitive shape as shown in FIG. 1C to allow for adjustment of the position of the axle to be mounted in the prong.

In the typical standard yoke structure now available, the axle to be mounted has a circular shaft which is placed in the standard constant width slot and it is retained in place by bolts and elements such as lock washers threaded to the end of the shaft. This prior art arrangement is seriously deficient in that the axle is free to escape through the open end of the slot in the event the locking bolt becomes loosened.

Referring now to FIGS. 2 and 3, the construction of the present invention is shown whereby the above-discussed deficiency of the prior art is overcome. An axle 18 to be mounted is positioned in enlarged end 14 with a threaded portion 20 extending beyond the outer surface of the fork prong. The diameter of shaft 18 is just slightly smaller than the width of slot 12 so that axle 18 can be inserted into the yoke structure merely by passing through the open end of slots 12. Thus, the diameter of axle 18 is significantly smaller than the dimensions of enlarged end 14, and shaft 18 is free to fall out of the yoke structure through the open end of slot 12 unless specific retaining structure is provided. The necessary retaining structure is in the form of a bushing 22 having a body portion 24, a shoulder 26, and a central passage 28. The outer periphery of body 24 conforms in size and shape to enlarged end 14, and the inner diameter of passage 28 conforms to axle 18.

As shown in FIG. 3, bushing 22 is positioned in enlarged end 14 with shaft 18 being positioned in the central passage of the bushing. The bushing takes up the excess space between axle 18 and enlarged end 14, and the central passage of the bushing provides a mounting opening for axle 18. Since the outer periphery of body 24 of bushing 22 conforms in size and shape to enlarged end 14, downward movement of the bushing into the narrower section of slot 12 is prevented because the bushing is wider than the narrow section of the slot. Thus, escape of axle 18 through slot 12 is prevented as long as the bushing is in place. The bushing is retained in place by a washer 30 and a nut 32 which is mounted on threaded end 20 and serves to tighten shoulder 26 between washer 30 and the outer periphery of prong 10.

As shown in FIGS. 4 and 5, shoulder 26 may be slotted and provided with a series of raised segments 34 so that the outer surface of shoulder 26 also serves as a lockwasher element, and thus washer 30 may be eliminated.

As previously indicated, the pattern of enlarged end 14 may be repeated, such as is illustratively shown in FIG. 1C, so that the position of axle 18 with respect to the yoke may be adjusted in accordance with the selected opening in which the bushing and axle are mounted. Bearing in mind that a wheel (not shown) is mounted on the enlarged section of axle 18, it can thus be seen that the height of the vehicle, such as a bicycle, from which yoke 10 extends can be easily adjusted.

Referring now to FIGS. 6 and 7, an alternative embodiment of the present invention is shown. In this alternative embodiment, the width of section 13 of slot 12 is made narrower than it ordinarily would be, that narrower width being less than the standard diameter of the axle 18 and threaded end 20. In order to allow for passage of the axle 18 and threaded end 20 through this especially narrow section of slot 12, the axle and threaded portion are reduced in size, such as by grinding or machining, at two diametrically opposed locations to produce flat surfaces 36 and 38, the thickness of the axle and thread elements between flat surfaces 36 and 38 being sufficient to allow passage through reduced slot 12. Mounting of the axle in enlarged end 14 is accomplished by passing axle 18 through slot 12 with flats 36 and 38 positioned parallel to the sides of slot 12. When the axle is then passed into enlarged end 14, it is rotated 90° so that the larger dimension, i.e., the diameter of the axle before machining or grinding, is perpendicular to the slot. In this rotated position of axle 18, passage of axle 18 through slot 12 is prevented because of overlap and interference between the axle and the shoulder 39 formed between section 13 and enlarged end 14. A bushing element 40 having a thickened projection 42 is then inserted over threaded end 20 so that the thickened projection 42 serves to take up slack between the flats and the inner surface of enlarged end 14. A nut is then mounted on threaded end 20 to lock the structure in place. Of course, it will be understood that the shape of bushing 14 need not be as shown in FIGS. 6 and 7; but rather, it could be of any other suitable shape to take up the spacing resulting from the presence of the flattened elements in enlarged end 14. Furthermore, if desired, bushing 40 could actually be eliminated entirely and reliance placed merely on the locking action of nut 32 and other locking elements if desired, to prevent movement of the axle in enlarged end 14.

As can be seen from the foregoing description, the present invention produces a fork mounting which overcomes the prior art problem of disengagement of the axle upon loosening of the nut. If the nut 32 should become loosened in the structure of the present invention, passage of the axle through the open end of slot 12 will still be prevented, either by bushing 22 in one embodiment or by either bushing 40 or shoulder 39 in the other embodiment. Of course, disengagement could still occur in the embodiment of FIG. 1 if bushing 22 is lost, but such disengagement could occur only upon complete loss of both the nut and the bushing rather than merely upon loosening of the nut. Furthermore, sizing of the bushing can be such as to provide a relatively tight fit in enlarged end 14 so that the bushing is retained even though the nut is entirely removed. In any event, the danger of accidental disengagement of the entire axle is either eliminated or, at the very least, substantially reduced, and the user of the vehicle will have an opportunity to discover that the nut has become loosened or lost before any inadvertent disengagement of the axle takes place.

While a preferred embodiment has been shown and described, various modifications and substitutions may be made without departing from the spirit and scope of this invention. Accordingly, it is to be understood that this invention has been described by way of illustration and not limitation.

What is claimed is:

1. A fork element for wheel mountings including:
   at least one fork prong, said prong having an end portion;
   an open ended slot at one end of said end portion, said slot having a first narrow section and a second enlarged section, said enlarged section of said slot having a plurality of similarly shaped segments which define a plurality of shoulders;
   a shaft positioned in said enlarged section of said slot, said shaft having at least one width dimension less than the width of said narrow section and one dimension greater than said narrow section, said larger dimension of said shaft being aligned substantially perpendicular with respect to said narrow section of said slot whereby the position of said shaft can be adjusted between said slot enlarged section segments and said shoulders prevent inadvertent passage of said shaft through said slot narrow section; and
   securing means for securing said shaft to said prong.

2. A fork element for wheel mountings as in claim 1 further comprising:
   retaining means for retaining said shaft in said enlarged section of said slot in said prong, said retaining means including bushing means positioned in said enlarged section, said bushing means having a body portion sized to mate with said enlarged section, and said bushing having a central passage, said shaft being positioned in said central passage.

3. A fork element for wheel mountings as in claim 1 including:
   bushing means in said enlarged section, said shaft passing through said bushing means.

4. A fork element for wheel mountings as in claim 1 wherein said fork element includes two of said fork prongs, and wherein said shaft includes a bicycle axle.